(12) United States Patent
Mori

(10) Patent No.: US 11,618,654 B2
(45) Date of Patent: Apr. 4, 2023

(54) SUSPENDED LOAD CALCULATION DEVICE

(71) Applicant: SUMITOMO HEAVY INDUSTRIES CONSTRUCTION CRANES CO., LTD., Tokyo (JP)

(72) Inventor: Naoya Mori, Aichi (JP)

(73) Assignee: SUMITOMO HEAVY INDUSTRIES CONSTRUCTION CRANES CO., LTD., Tokyo (JP)

( * ) Notice: Subject to any disclaimer, the term of this patent is extended or adjusted under 35 U.S.C. 154(b) by 1108 days.

(21) Appl. No.: 16/255,412

(22) Filed: Jan. 23, 2019

(65) Prior Publication Data

US 2019/0241407 A1     Aug. 8, 2019

(30) Foreign Application Priority Data

Feb. 6, 2018   (JP) .............................. JP2018-019610

(51) Int. Cl.
| | | |
|---|---|---|
| *G01L 5/00* | (2006.01) | |
| *B66C 13/16* | (2006.01) | |
| *G01L 5/04* | (2006.01) | |
| *G01G 19/14* | (2006.01) | |
| *B66C 13/46* | (2006.01) | |
| *B66C 23/90* | (2006.01) | |

(52) U.S. Cl.
CPC .............. *B66C 13/16* (2013.01); *B66C 13/46* (2013.01); *B66C 23/905* (2013.01); *G01G 19/14* (2013.01); *G01L 5/04* (2013.01)

(58) Field of Classification Search
CPC ....... B66C 23/905; B66C 13/16; B66C 13/46; G01G 19/14; G01L 5/04
See application file for complete search history.

(56) References Cited

U.S. PATENT DOCUMENTS

| | | | | |
|---|---|---|---|---|
| 3,870,160 | A | * | 3/1975 | Hutchings ................ G06G 7/28 340/685 |
| 4,677,579 | A | * | 6/1987 | Radomilovich .......... E02F 9/26 73/862.56 |
| 5,823,370 | A | * | 10/1998 | Ueda ..................... B66C 23/905 212/276 |
| 2017/0334687 | A1 | * | 11/2017 | Wiest .................... B66C 23/821 |
| 2017/0336518 | A1 | * | 11/2017 | Nishimoto ............. G01S 19/53 |
| 2022/0146300 | A1 | * | 5/2022 | Letierce ................. G01G 19/08 |
| 2022/0149660 | A1 | * | 5/2022 | Miyamoto .............. H01F 38/14 |

FOREIGN PATENT DOCUMENTS

| | | |
|---|---|---|
| EP | 2 543 622 A1 | 1/2013 |
| JP | 2008-094623 A | 4/2008 |
| JP | 2015-157695 A | 9/2015 |

OTHER PUBLICATIONS

Search report issued in European Application No. 19152336.4, dated Jul. 19, 2019.

* cited by examiner

*Primary Examiner* — Max H Noori
(74) *Attorney, Agent, or Firm* — Michael Best & Friedrich LLP

(57) ABSTRACT

A suspended load calculation device includes a detection unit configured to detect information for specifying a load suspended by a crane, a calculation unit configured to calculate the suspended load based on a value detected by the detection unit, and an acquisition unit configured to acquire a boom length, in which the calculation unit corrects the suspended load by a correction value corresponding to the boom length acquired by the acquisition unit.

7 Claims, 6 Drawing Sheets

FIG. 3A

CORRECTION VALUE TABLE OF
BOOM LENGTH 10m

| BOOM ANGLE | CORRECTION VALUE |
|---|---|
| $\theta 1$ | H10_1 |
| $\theta 2$ | H10_2 |
| $\theta 3$ | H10_3 |
| $\theta 4$ | H10_4 |
| ... | ... |
| $\theta n$ | H10_n |

FIG. 3B

CORRECTION VALUE TABLE OF
BOOM LENGTH 20m

| BOOM ANGLE | CORRECTION VALUE |
|---|---|
| $\theta 1$ | H20_1 |
| $\theta 2$ | H20_2 |
| $\theta 3$ | H20_3 |
| $\theta 4$ | H20_4 |
| ... | ... |
| $\theta n$ | H20_n |

FIG. 3C

CORRECTION VALUE TABLE OF
BOOM LENGTH 30m

| BOOM ANGLE | CORRECTION VALUE |
|---|---|
| $\theta 1$ | H30_1 |
| $\theta 2$ | H30_2 |
| $\theta 3$ | H30_3 |
| $\theta 4$ | H30_4 |
| ... | ... |
| $\theta n$ | H30_n |

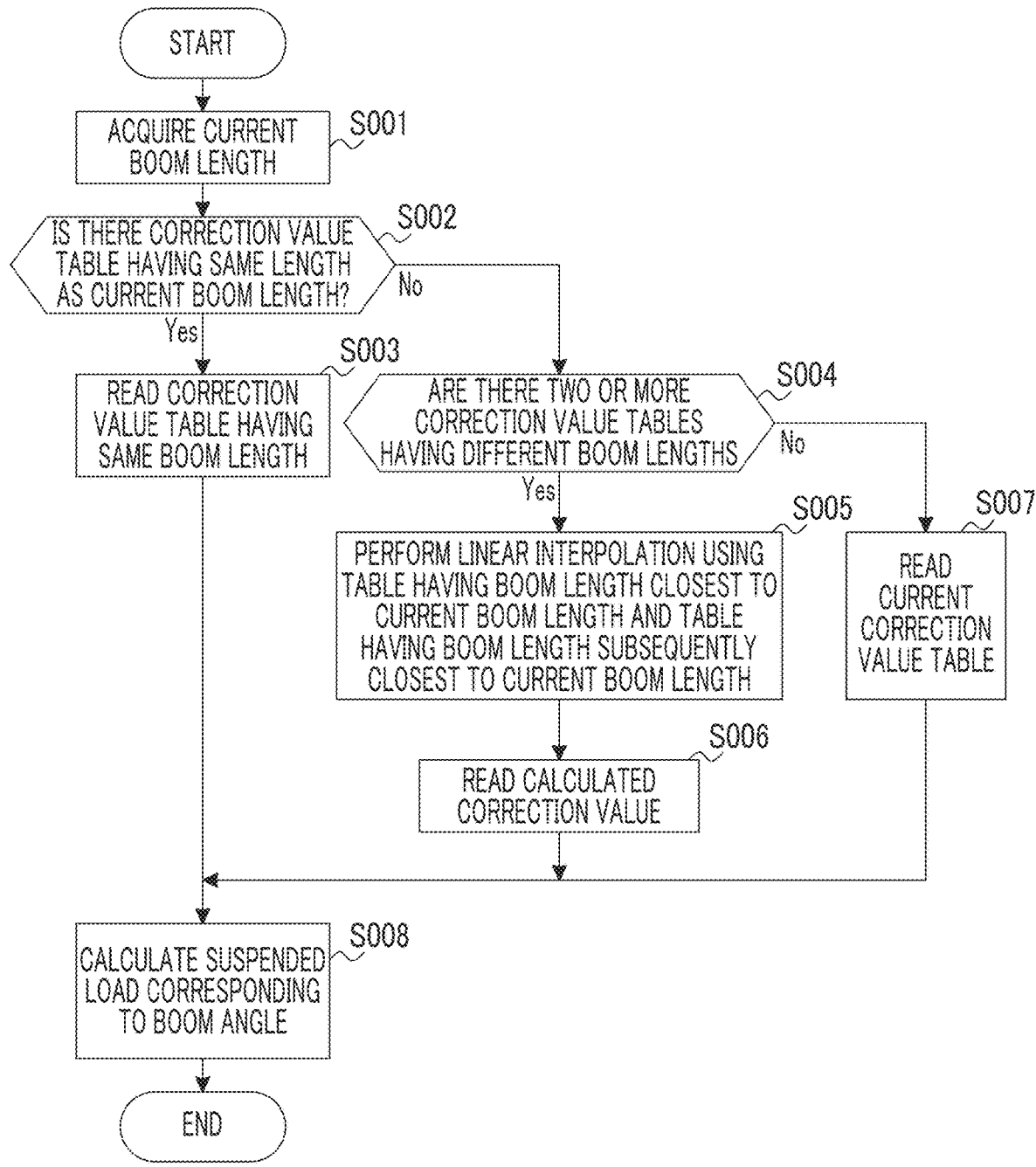

| BOOM ANGLE | CORRECTION VALUE |
|---|---|
| $\theta 1$ | $H15\_1 = H10\_1 + (H20\_1 - H10\_1) \times (15m - 10m)/(20m - 10m)$ |
| $\theta 2$ | $H15\_2 = H10\_2 + (H20\_2 - H10\_2) \times (15m - 10m)/(20m - 10m)$ |
| $\theta 3$ | $H15\_3 = H10\_3 + (H20\_3 - H10\_3) \times (15m - 10m)/(20m - 10m)$ |
| $\theta 4$ | $H15\_4 = H10\_4 + (H20\_4 - H10\_4) \times (15m - 10m)/(20m - 10m)$ |
| ... | ... |
| $\theta n$ | $H15\_n = H10\_n + (H20\_n - H10\_n) \times (15m - 10m)/(20m - 10m)$ |

SUSPENDED LOAD CALCULATION DEVICE

RELATED APPLICATIONS

Priority is claimed to Japanese Patent Application No. 2018-019610, filed Feb. 6, 2018, the entire content of which is incorporated herein by reference.

BACKGROUND

Technical Field

Certain embodiment of the present invention relates to a suspended load calculation device which calculates a suspended load.

Description of Related Art

In the related art, there is a crane having a function for displaying a suspended load with respect to an operator. The crane includes a suspended load calculation device which calculates the suspended load based on a tension acting on a derricking rope which raises or lowers a boom.

SUMMARY

According to an embodiment of the present invention, there is provided a suspended load calculation device including: a detection unit configured to detect information for specifying a load suspended by a crane; a calculation unit configured to calculate the suspended load based on a value detected by the detection unit; and an acquisition unit configured to acquire a boom length, in which the calculation unit corrects the suspended load by a correction value corresponding to the boom length acquired by the acquisition unit.

BRIEF DESCRIPTION OF THE DRAWINGS

FIGS. 3A to 3C are diagrams showing an example of a correction value table of the embodiment.

FIG. 4 is a flowchart showing an operation example of a correction value acquisition unit of the embodiment.

DETAILED DESCRIPTION

In a case where a suspended load is obtained based on tension of a derricking rope using a suspended load calculation device of the related art, influences of friction between the derricking rope and a sheave or influences of a fleet angle due to a change in a distance between a fixed sheave and a movement sheave are displayed in detection results of the tension of the derricking rope. As a result, an output value (hereinafter, also referred to as a display load) of the suspended load may be changed according to a change of a derricking angle of the boom.

In order to solve this problem, in the related art, a technology is disclosed in which a suspended load is calculated using a correction value corresponding to a derricking angle of a boom and a calculated suspended load is displayed to an operator. In the related art, a different correction value for each boom derricking angle is derived with reference to a correspondence table between the boom derricking angle and the correction value and the suspended load is calculated.

The boom turnably journaled on a crane can be replaced so as to have a suitable length according to a location condition of a site or a use of the site. If a boom having a different length is replaced, a length of the derricking rope is different, which causes a difference in a display load.

By using the technology of the related art, a difference between an actual load and the display load of the suspended load is alleviated. However, even when the boom has any length, only one correspondence table (the correspondence table between the boom derricking angle and the correction value) is used, and thus, it is not possible to absorb an error of a display load caused by the length of the boom.

It is desirable to provide a technology for improving calculation accuracy of the suspended load.

According to the present invention, it is possible to calculate the suspended load using a correction value corresponding to a boom length, and it is possible to obtain the suspended load with high accuracy.

Figure 1:
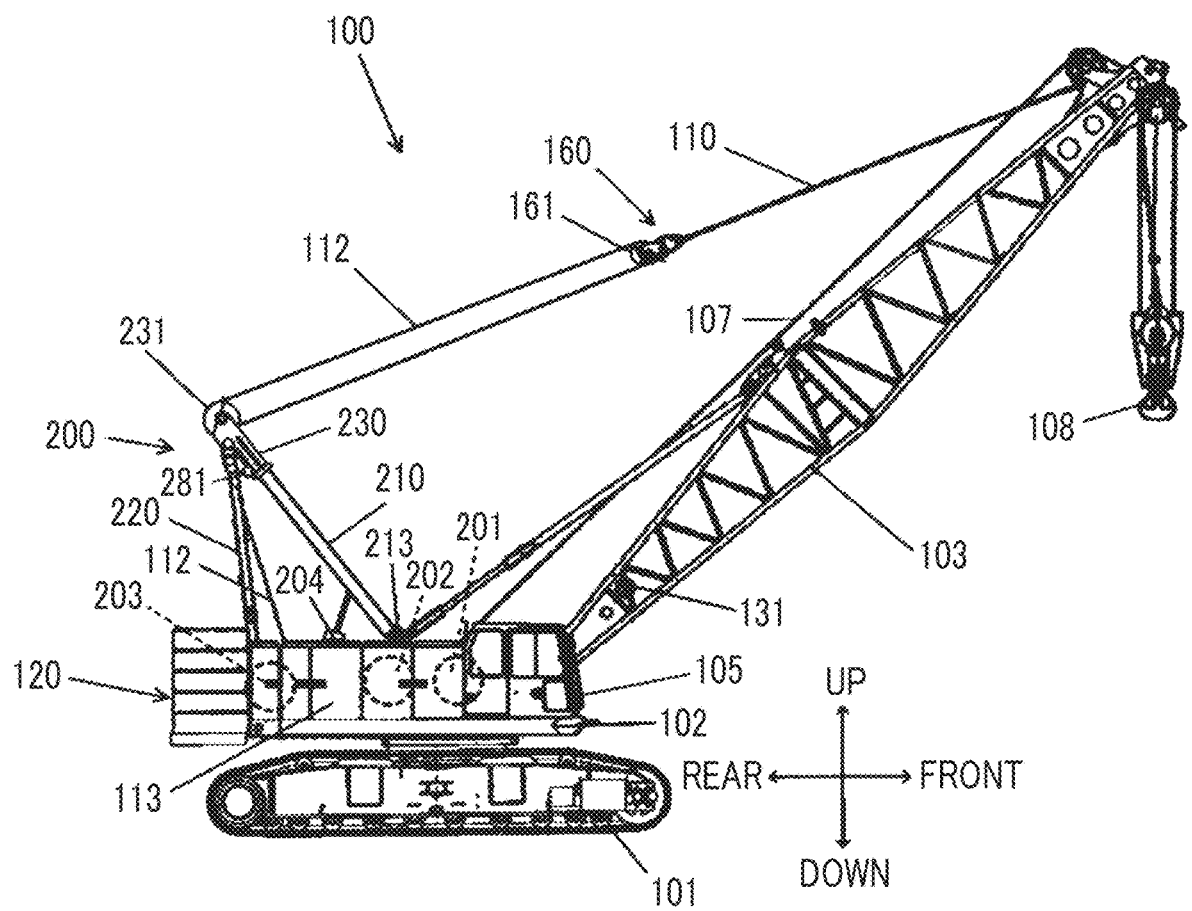
FIG. 1 is a side view of a crane of an embodiment.

Hereinafter, an embodiment of a suspended load calculation device according to the present invention will be described with reference to the drawings. FIG. 1 is an exterior side view of a crane having the suspended load calculation device according to the embodiment of the present invention.

A crane 100 includes a traveling body 101, a turning body 102 which is turnably provided on the traveling body 101 via a turning wheel, and a lattice boom (hereinafter, simply referred to as a boom 103) which is rotatably journaled on the turning body 102. An operator cab 105 is provided on a front portion of the turning body 102, and a counterweight device 120 is attached to a rear portion of the turning body 102.

In the boom 103, a base portion of the boom 103 is rotatably journaled on a frame of the turning body 102 on a side of the operator cab 105. Three drums are disposed in a housing 113 of the turning body 102. In the three drums, a front drum 201, a rear drum 202, and a derricking drum 203 are attached in this order from the front toward the rear. A hook 108 is hung from a tip portion of the boom 103 by a hook rope 107. One end of the hook rope 107 is fixed to the front drum 201, and the hook rope 107 is wound up around the front drum 201 or is fed out from the front drum 201 by a rotation of the front drum 201. Accordingly, the hook 108 held on the other end side of the hook rope 107 ascends or descends with respect to a tip portion of the boom 103.

A gantry 200 is mounted on the turning body 102 so as to be raised or lowered with respect to the turning body 102. The gantry includes a front leg member 210, a rear leg member 220, and a lower spreader 230 which is fixed to an upper end side of the front leg member 210. A base portion 213 of the front leg member 210 is rotatably connected to a bracket which is provided at a center portion of the turning body 102. A base portion of the rear leg member 220 is rotatably connected to a bracket which is provided on a rear portion side of the turning body 102. The gantry 200 is stood or lowered by expansion or contraction of a hydraulic cylinder 204.

The lower spreader 230 includes a low sheave group 231 configured of a plurality of lower sheaves. An upper spreader 160 is interposed between the lower spreader 230 and a tip portion of the boom 103. The upper spreader 160 includes an upper sheave group 161 configured of a plurality of upper sheaves. The derricking rope 112 is wound around the upper sheave group 161 of the upper spreader 160 and the low sheave group 231 of the lower spreader 230 plural times.

One end of the upper spreader 160 is connected to the other end of a pendant rope 110 which is fixed to the tip portion of the boom 103. The derricking rope 112 whose one end is fixed to the derricking drum 203 is connected to a load cell 281 whose the other end is attached to the lower spreader 230, and the load cell 281 side becomes a fixed end of the derricking rope 112. If the derricking rope 112 is wound up or fed out by a rotation of the derricking drum 203, an interval between the lower spreader 230 and the upper spreader 160 is changed, and thus, the boom 103 is raised or lowered via the derricking rope 112.

The rear drum is used for ascending or descending of an auxiliary hook or raising or lowering of a jib boom. However, FIG. 1 shows a state where the rear drum 202 is not used.

Figure 2:
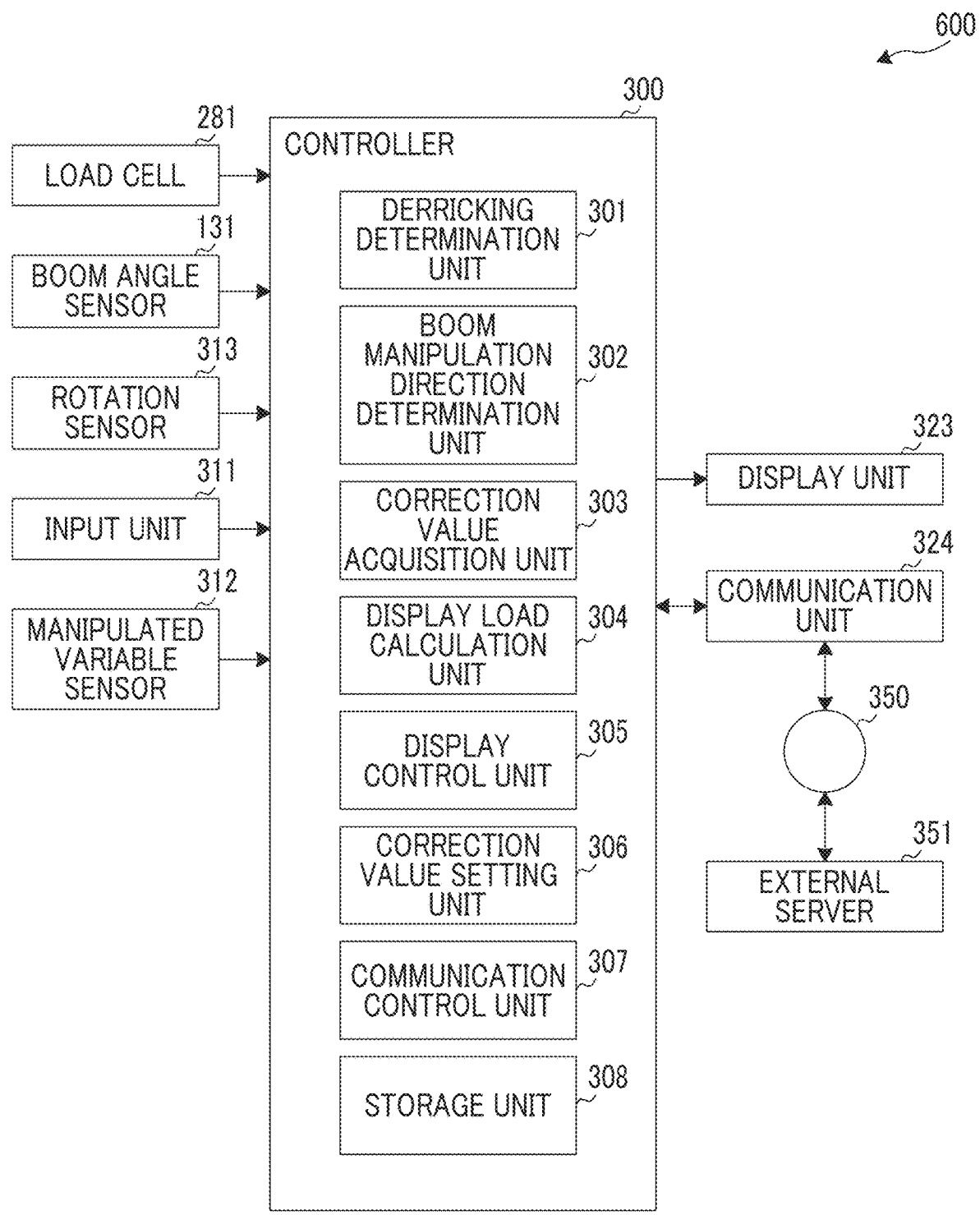
FIG. 2 is a block diagram of a suspended load calculation device of the embodiment.

FIG. 2 is a control system block diagram of the suspended load calculation device mounted on the crane 100. The suspended load calculation device may share some or all of equipment configurations of an overload prevention device of the related art provided in the crane 100.

A suspended load calculation device 600 includes a controller 300 configured to include an arithmetic processing device having a CPU, a storage device such as a ROM, a RAM, a storage unit (for example, a hard disk drive), other peripheral circuits, or the like. The load cell 281, a boom angle sensor 131, a rotation sensor 313, an input unit 311, a manipulated variable sensor 312, a display unit 323, and a communication unit 324 are connected to the controller 300.

The boom angle sensor 131 is attached to a base side of the boom 103 (refer to FIG. 1), detects a derricking angle (hereinafter, referred to as a boom angle) of the boom 103, and outputs a control signal corresponding to the detected derricking angle to the controller 300. For example, the boom angle sensor 131 detects a ground angle, which is an angle with respect to a horizontal plane, as the derricking angle of the boom 103.

The load cell 281 is a tension detection unit which detects a tension acting on the derricking rope 112 which raises or lowers the boom 103 and outputs a control signal corresponding the detected tension to the controller 300. That is, the load cell 281 functions as a detection unit which detects information (tension value) for specifying a suspended load of the crane 100.

For example, the input unit 311 is a touch panel and outputs a control signal corresponding to manipulation of an operator to the controller 300. The operator manipulates the input unit 311, and thus, can set a multiplication number of the derricking rope 112, a boom length, a weight of the hook 108, or the like. Each set value is stored in the storage unit 308 in the controller 300. Therefore, the input unit 311 function as an acquisition unit which acquires the boom length.

For example, the rotation sensor 313 is a rotary encoder, detects a rotation direction of the derricking drum 203, and outputs a control signal corresponding to the detected rotation direction to the controller 300. The manipulated variable sensor 312 detects a manipulated variable of a hydraulic pilot type manipulating lever and outputs a control signal corresponding to the detected manipulated variable to the controller 300.

For example, the display unit 323 is a touch panel type display which is also used as the input unit 311 and displays information (hereinafter, also referred to as a display load) of the suspended load or information of a work posture on a display screen based on a control signal output from the controller 300.

The controller 300 functions as a calculation unit which calculates the suspended load based on a value detected by the load cell 281, and also has a function which corrects the suspended load by a correction value corresponding to the boom length acquired by the input unit 311.

The controller 300 includes a derricking determination unit 301, a boom manipulation direction determination unit 302, a correction value acquisition unit 303, a display load calculation unit 304, a display control unit 305, a correction value setting unit 306, a communication control unit 307, and a storage unit 308.

In a case where the rotation sensor 313 detects that the derricking drum 203 is rotated in one direction, the derricking determination unit 301 determines that the boom 103 is in a standing motion, that is, boom raising manipulation is performed. In a case where the rotation sensor 313 detects that the derricking drum 203 is rotated in the other direction, the derricking determination unit 301 determines that the boom 103 is in a lowering motion, that is, boom lowering manipulation is performed.

In a case where the manipulated variable sensor 312 detects a raising-side manipulated variable equal to or more than a predetermined value, the boom manipulation direction determination unit 302 determines that the boom raising manipulation is performed. In a case where the manipulated variable sensor 312 detects a lowering-side manipulated variable equal to or more than a predetermined value, the boom manipulation direction determination unit 302 determines that the boom lowering manipulation is performed.

The correction value acquisition unit 303 acquires a correction value corresponding to the boom angle detected by the boom angle sensor 131. As shown in FIGS. 3A to 3C, a correction value table in which the boom angle and the correction value used when the suspended load is calculated are associated with each other is stored in the storage unit 308 of the controller 300. In addition, as shown in FIGS. 3A to 3C, a plurality of correction value tables are stored for each boom length, that is, in association with the boom length. In the present example, the correction value table is stored for each boom length of 10 m, 20 m, and 30 m. The correction value acquisition unit 303 selects the correction value table based on the boom length input by the input unit 311.

The display load calculation unit 304 extracts the correction value corresponding to the current boom angle with reference to the correction value table selected by the correction value acquisition unit 303 and calculates a suspended load for display using the correction value. The display load calculation unit 304 corrects a tension (hereinafter, referred to as a load cell detection tension or simply referred to as a detection tension) acting on the derricking rope 112 detected by the load cell 281 using the extracted correction value so as to calculate the suspended load. Moreover, detailed operations of the correction value acquisition unit 303 and the display load calculation unit 304 will be described later.

The display control unit 305 controls an image which is displayed on the display screen of the display unit 323. The display control unit 305 displays the suspended load for display calculated by the display load calculation unit 304 on the display screen of the display unit 323.

The crane 100 of the present embodiment has a function for newly providing or updating each correction value table shown in FIG. 3 and the correction value setting unit 306 is responsible for this function. In addition, the communication control unit 307 transmits the correction value table newly obtained by the correction value setting unit 306 or the updated correction value table to an external server 351 via the communication unit 324 and a network 350. In addition, in the present embodiment, data communication is performed using wireless communication means. Detailed operations of the correction value setting unit 306 and the communication control unit 307 will be described later.

The storage unit 308 stores the correction value table, in which the correction value is registered, for each boom length. In the present example, for example, each correction value table shown in FIGS. 3A to 3C is stored in the storage unit 308 for each boom length. In drawings shown in FIGS. 3A to 3C, it is described that the table in which the boom angle and the correction value are associated with each other is provided so as to be associated with each boom length. However, a manner of providing the correspondence relationship of the data is not limited to this. For example, a table in which the boom length and the correction value are associated with each other may be provided for each boom angle, or a table in which the boom length, the boom angle, and the correction value are associated with each other may be stored in the storage unit 308.

Next, the detailed operations of the correction value acquisition unit 303 and the display load calculation unit 304 will be described with reference to a flowchart of FIG. 4.

The correction value acquisition unit 303 acquires the length of the boom 103 which is input by the operator via the input unit 311 and is turnably journaled on the crane 100 currently (S001).

The correction value acquisition unit 303 determines that the correction value table having the same length as the input boom length is stored in the storage unit 308 (S002). For example, if the input boom length is 10 m, in Step S002, a positive determination result is obtained in a case where the correction value table for 10 m exists in the storage unit 308 in advance, and a negative determination result is obtained in a case where the correction value table for 10 mm does not exist.

In a case where the correction value table having the same length as the input boom length is stored (S002: Yes), the correction value acquisition unit 303 reads the correction value table of the boom length (S003) and advances the processing to Step S008.

Meanwhile, in a case where the correction value table having the same length is not stored (S002: No), the correction value acquisition unit 303 determines whether there are two or more correction value tables of different boom lengths (S004). In a case where only one correction value table exists (S004: No), the correction value acquisition unit 303 reads the correction value table regardless of the acquired boom length (S007) and advances the processing to Step S008.

In a case where two or more correction value tables exist (S004: Yes), the correction value acquisition unit 303 calculates the correction value corresponding to the acquired boom length based on each correction value registered in the existing correction value table. In the present embodiment, the correction value acquisition unit 303 performs linear interpolation processing which reads two correction value tables of a boom length closest to the boom length acquired in Step S001 and a boom length subsequently closest to the boom length acquired in Step S001 and calculates the correction value corresponding to the boom length based on each correction value registered in the correction value table (S005).

Figures 5, 6:
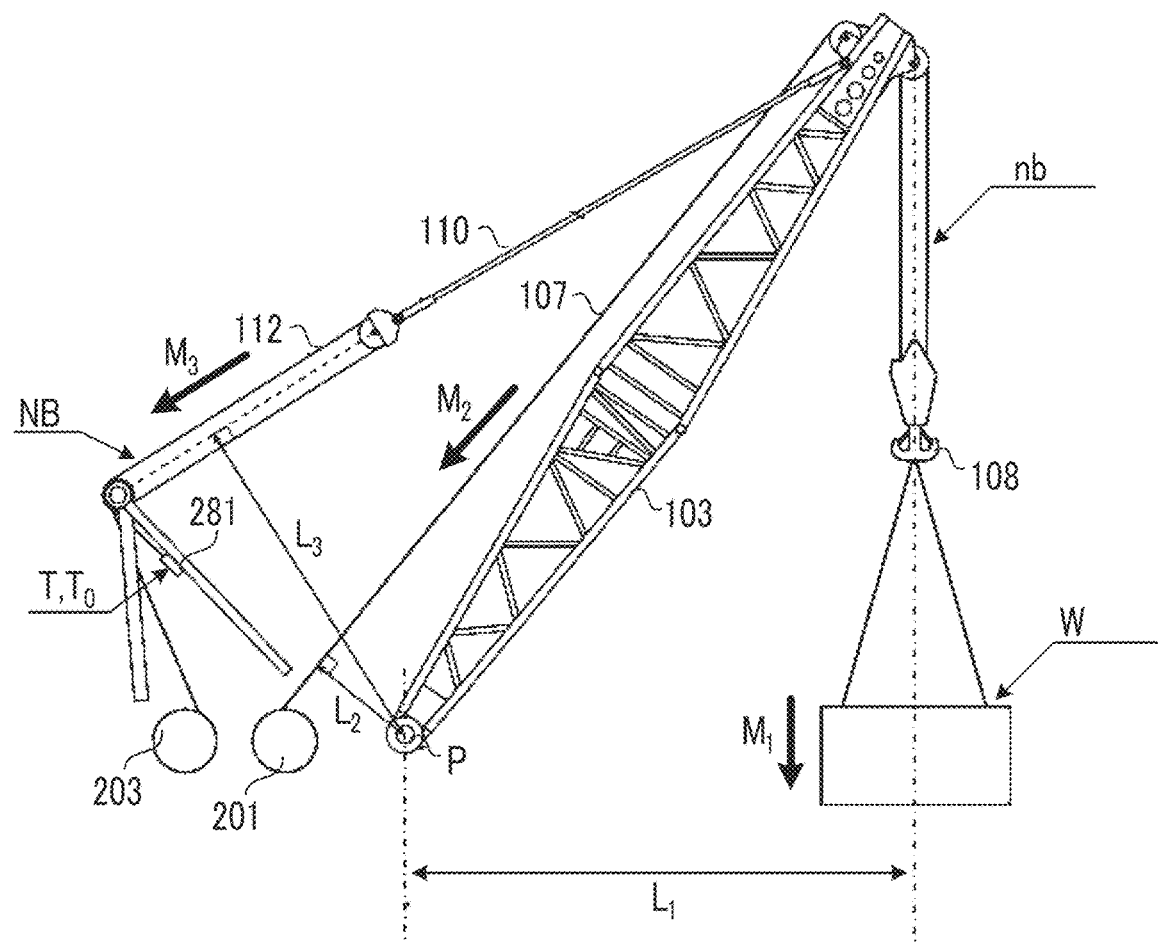
FIG. 5 is a diagram explaining an example of interpolation processing of the embodiment.
FIG. 6 is a view showing a derivation method of a suspended load calculation formula of the embodiment.

Here, a specific example of the linear interpolation processing of Step S005 will be described. Here, as shown in FIGS. 3A to 3C, it is assumed that the correction value tables of the respective boom length of 10 m, 20 m, and 30 m are stored. In addition, it is assumed that the length (the boom length acquired in Step S001) of the boom which is turnably journaled on the crane 100 currently is 15 m. Since the correction value table for 15 m does not exist in the storage unit 308, the correction value acquisition unit 303 reads the correction value tables for 10 m and 20 m close to 15 m, and uses an interpolation formula shown in FIG. 5 to calculate the correction value corresponding to each boom angle. In addition, in FIG. 5, "H15_N" is each correction value for 15 m which is a calculation target (N is a positive value corresponding to the boom angle), and "H10_N" and "H20_N" are the respective correction values shown in FIGS. 3A and 3B. In addition, "m" in FIG. 5 is a symbol in meters.

The correction value acquisition unit 303 reads the correction value (H15_N) which is linearly interpolated (S006) and advances the processing to Step S008.

The display load calculation unit 304 calculates the suspended load for display corresponding to the current boom angle using the correction value read in any of Steps S003, S006, and S007 (S008). A calculation formula used in Step S008 will be described below.

For calculating the display load, there are a method of directly detecting weight of a suspension load and a method of calculating weight of the suspended load from a balance of a moment around the base portion (boom foot) of the boom. In the present embodiment, the latter method is adopted, which can take into consideration the influence of disturbance such as wind. In the latter method, there are a derricking rope end detection method, a pendant rope detection method, an equalizer pin detection method, or the like. However, here, the derricking rope end detection method which is a mainstream will be described.

FIG. 6 is a schematic view showing a balance of a moment. Moments $M_1$, $M_2$, and $M_3$ applied around a boom foot P are represented as follows.

$M_1$: moment by suspended load [Nm]
$M_2$: moment of hook rope 107 [Nm]
$M_3$: moment of derricking rope 112 [Nm]

The balance of the respective moments of the $M_1$, $M_2$, and $M_3$ is as follows. In addition, a left side of the following Formula (1) indicates an overturning moment and a right side thereof indicates a boom support moment.

$$M_1 = M_2 + M_3 \tag{1}$$

In addition, the moments $M_1$, $M_2$, and $M_3$ can be represented by the following Formulas.

$$M_1 = W \cdot L_1 \tag{2}$$

$$M_2 = (W/nb) \cdot L_2 \tag{3}$$

$$M_3 = T \cdot Hy \cdot NB \cdot L_3 \tag{4}$$

Meanings of the respective symbols described in Formulas (2) to (4) are as follows.

$L_1$: horizontal distance from boom foot P to center of hook 108 [m]
$L_2$: shortest distance from boom foot P to hook rope 107 [m]

$L_3$: shortest distance from boom foot P to derricking rope 112 [m]

nb: multiplication number of hook rope 107 [number]

W: display load of calculation target [t]

Hy: correction value [−]

NB: multiplication number of derricking rope 112 [number]

T: load cell detection tension [N]

If Formulas (2) to (4) are substituted into Formula (1) to solve for W, the following Formula is obtained.

[Expression 1]

$$\left| W = \frac{(T \cdot Hy - T_0) \cdot NB \cdot L_3}{L_1 - L_2/nb} \right| \quad (5)$$

Here, $T_0$ is an own weight value [N].

$L_2$, $L_3$, $T_0$, nb, NB are values previously obtained as parameters by a program of a moment limiter, and Hy is the correction value corresponding to the boom angle obtained by the above procedure. In addition, since $L_1$ is obtained from the length of boom 103 and the boom angle, the display load W can be calculated by obtaining the boom angle and the detection tension T of the load cell 281. That is, the display load calculation unit 304 inputs a boom angle θ from the boom angle sensor 131, inputs the detection tension T from the load cell 281, and incorporates the correction value Hy corresponding to the boom angle into Formula (5) to calculate the display load W.

According to the above-described aspect, the correction value table corresponding to the boom length is selected, and thus, the display load corresponding to the boom angle can be calculated. In addition, in a case where the correction value table corresponding to the length of the boom which is currently used does not exist, it is possible to use a suitable correction value by performing numerical interpolation. Meanwhile, in a case where it is desired to obtain a more suitable display load, the correction value setting unit 306 can newly prepare a correction value for the own machine or update the data. This operation will be described with reference to a flowchart of FIG. 7.

The correction value setting unit 306 calculates the correction value corresponding to the boom angle for each boom angle (S101). The details of Step S101 will be described.

In the present embodiment, the correction value (hysteresis coefficient) Hy is obtained by operating the crane according to the following procedure. In addition, here, the correction value table is obtained by operating the crane 100 shown in FIG. 1. However, the correction value table obtained by operating other cranes may be applied to the crane 100.

In the present method, it is started from a state where the boom 103 is hoisted to an upper limit angle in a state of an empty hook (no suspended load and a self-weight state in which only the hook 108 exists). In this case, the hook 108 is hoisted so as to reach a height where the hook 108 does not stick to the ground even if it is a lower limit angle of the boom 103.

After the operation starts, the boom 103 is lowered and the lowering motion is performed. In addition, whether the motion is the lowering motion or the standing motion can be determined the derricking determination unit 301 or the boom manipulation direction determination unit 302. In addition, in this case, the hook 108 is not manipulated. This is to prevent a vertical vibration from occurring due to the manipulation of hoisting or lowering the hook 108 so as to prevent occurrence of an error in the detection tension.

In the controller 300, the boom angle (here, referred to as an angle point) for performing a hysteresis correction is stored in the storage unit 308 in advance. In this example, it is assumed that (20°, 40°, 55°, 65°, 74.7°, and 79.5°) are stored. When the derricking manipulation and the lowering manipulation are performed, if the boom passes through the angle point, the correction value setting unit 306 temporarily stores the detection tension $T_L$ at the time of the lowering detected when the boom passes through the angle point.

After the boom passes through all the angle points by the lowering manipulation, the boom is hoisted to the upper limit angle. Even in this case, the hook 108 is not hoisted or lowered. In addition, when the boom passes through the angle point, the correction value setting unit 306 temporarily stores the detection tension $T_H$ at the time of the hoisting.

If the boom 103 is hoisted to the upper limit angle, the correction value Hy at each angle point is calculated based on the detection tension $T_L$ stored at the time of the lowering and the detection tension $T_H$ stored at the time of the hoisting. A calculation formula of the correction value Hy is represented as follows.

[Expression 2]

$$Hy = \sqrt{T_L T_H} \quad (6)$$

The correction value setting unit 306 calculates the correction value Hy for each angle point using Formula (6) and associates the angle point and the correction value Hy with each other.

Figure 7:
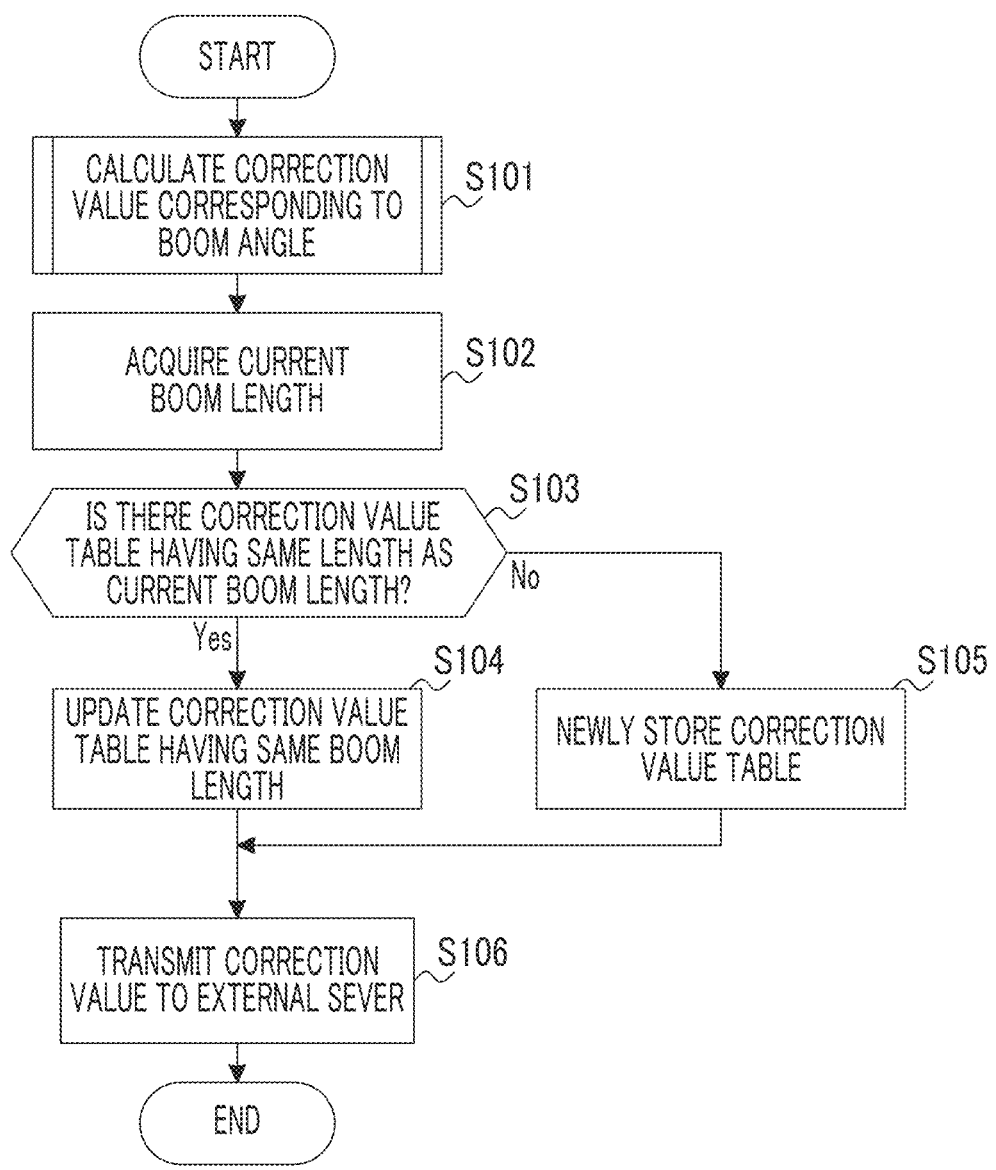
FIG. 7 is a flowchart showing an operation example of a correction value setting unit of the embodiment.

Returning to descriptions of the flowchart of FIG. 7. The correction value setting unit 306 acquires the length of the boom 103 which is input by the operator via the input unit 311 and is turnably journaled on the crane 100 currently (S102). In addition, Step S101 and S102 may be performed to be interchanged.

The correction value setting unit 306 determines whether or not there is the correction value table having the same length as the input boom length (S103).

In a case where there is the correction value table having the same length as the input boom length (S103: Yes), the correction value setting unit 306 updates the correction value table having the boom length with the correction value acquired by Step S101 (S104). Meanwhile, in a case where there is no correction value table having the same length (S103: No), the correction value setting unit 306 associates the correction value table of the value acquired in Step S101 with the input boom length so as to newly prepare the correction value table (S105).

The communication control unit 307 associates information of the input boom length and the correction value of the boom angle acquired in Step S101 and transmits this association to the external server 351 (S106). In this case, data required for data management, such as information regarding the type of the crane 100 and individual identification information, is also transmitted. The external server 351 accumulates the obtained data and performs data optimization processing or the like so as to obtain a more suitable display load.

In addition, the crane 100 may add an implementation to obtain suitable correction value data from external server 351. In this case, the communication control unit 307 of the crane 100 transmits the information on the length of the boom currently used to the external server 351. The external server 351 replies the stored correction value table corresponding to the accumulated boom length, and the crane 100 stores and reflects the stored correction value table. By doing this, it is possible to calculate the suspended load for display by using a more suitable correction value table.

In the present embodiment, the correction value corresponding to the boom angle is obtained using the table in which the boom angle and the correction value are associated with each other. However, the correction value corresponding to the boom angle may be obtained by a mathematical expression. For example, the correction value may be obtained by formulating each data of the correction value table by using a method of least squares or the like and inputting boom angle to the mathematical expression.

In the present embodiment, the boom length, the boom angle, and the correction value are associated with each other, and the correction value is obtained using the boom length and the boom angle. However, only the boom length may be associated with the correction value such that the correction value is obtained by only the boom length.

In the present embodiment, as the information for specifying the suspended load of the crane, the tension of the derricking rope is detected. However, the present invention is not limited to this, and any information may be detected as long as it can specify the suspended load. For example, the tension of another rope may be detected or a dedicated load sensor may be installed.

In addition, the method for calculating the correction value, the method for calculating the suspended load for display using the correction value, or the like is not limited to the above-described methods.

As described above, according to the present embodiment, the suspended load can be calculated using the correction value corresponding to the boom length in addition to the boom angle, and thus, it is possible to obtain the display load having high accuracy.

It should be understood that the invention is not limited to the above-described embodiment, but may be modified into various forms on the basis of the spirit of the invention. Additionally, the modifications are included in the scope of the invention.

What is claimed is:

1. A suspended load calculation device comprising:
    a detection unit configured to detect a value for specifying a load suspended by a crane;
    a calculation unit configured to calculate the load based on the value detected by the detection unit;
    an acquisition unit configured to acquire a boom length; and
    a storage unit configured to store a plurality of registered correction values for the load, each of the plurality of registered correction values for the load corresponding to one boom length of a plurality of registered boom lengths;
    wherein the calculation unit is configured to correct the load by a first correction value for the load corresponding to the acquired boom length; and
    wherein the calculation unit is configured to calculate a correction value for the load based on one or more of the plurality of registered correction values for the load when the acquired boom length does not correspond to the registered boom lengths.

2. The suspended load calculation device according to claim 1,
    wherein the storage unit comprises correction value tables, one of the correction value tables includes one of the registered correction values for the load and one of the registered boom lengths, and the one of the registered correction values for the load corresponds to the one of the registered boom lengths.

3. The suspended load calculation device according to claim 2,
    wherein
    the correction value tables comprise a first correction value table that includes a first registered correction value for the load and a first registered boom length, the first registered boom length being closest to the acquired boom length;
    the correction value tables comprise a second correction value table that includes a second registered correction value for the load and a second registered boom length, the second registered boom length being subsequently closest to the acquired boom length; and
    the calculation unit calculates the correction value for the load based on the first registered correction value for the load and the second registered correction value for the load.

4. The suspended load calculation device according to claim 2,
    wherein, when one of the correction value tables includes one of the registered boom lengths that is equal to the acquired boom length, the calculation unit is configured to correct the load using the registered correction value for the load registered in the one of the correction value tables.

5. The suspended load calculation device according to claim 2, further comprising:
    a setting unit configured to:
        acquire the acquired boom length,
        calculate a new correction value for the load corresponding to the acquired boom length,
        determine whether one of the correction value tables includes a registered boom length that is equal to the acquired boom length, and
        update, when the setting unit determines that the one of the correction value tables includes the registered boom length that is equal to the acquired boom length, the one of the correction value tables by the new correction value for the load, or
        create, when the setting unit determines that any one of the correction value tables does not include the registered boom length that is equal to the acquired boom length, a new correction value table with the new correction value for the load and the acquired boom length.

6. The suspended load calculation device according to claim 5, further comprising:
    a communication control unit configured to:
        associate the new correction value for the load and the acquired boom length, and
        output the association.

7. The suspended load calculation device according to claim 1,
    wherein the detection unit is a tension detection unit configured to detect a tension acting on a derricking rope which raises or lowers a boom.

* * * * *